United States Patent Office 3,553,013
Patented Jan. 5, 1971

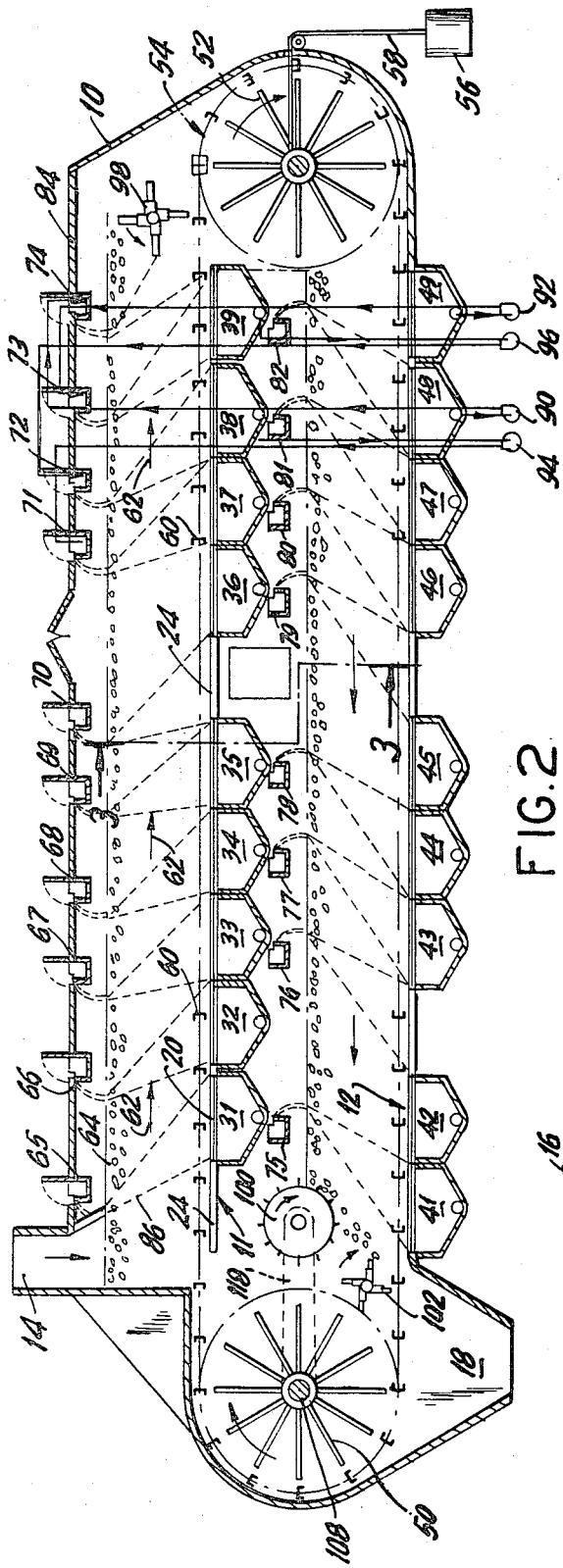
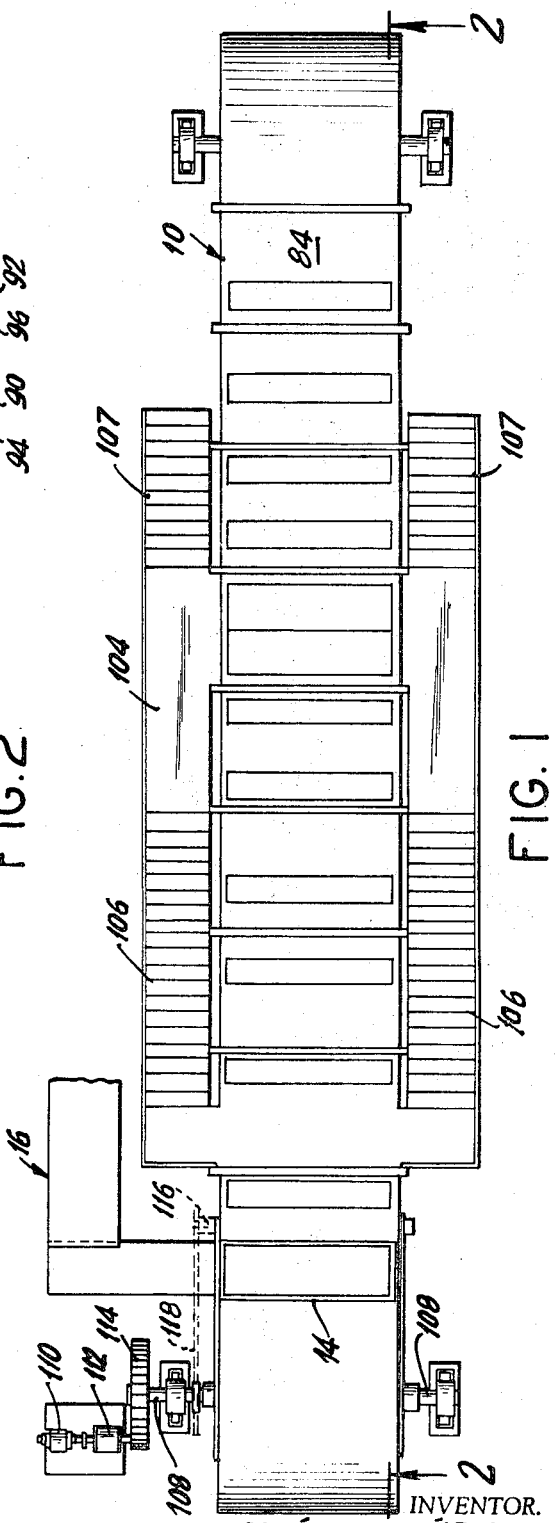

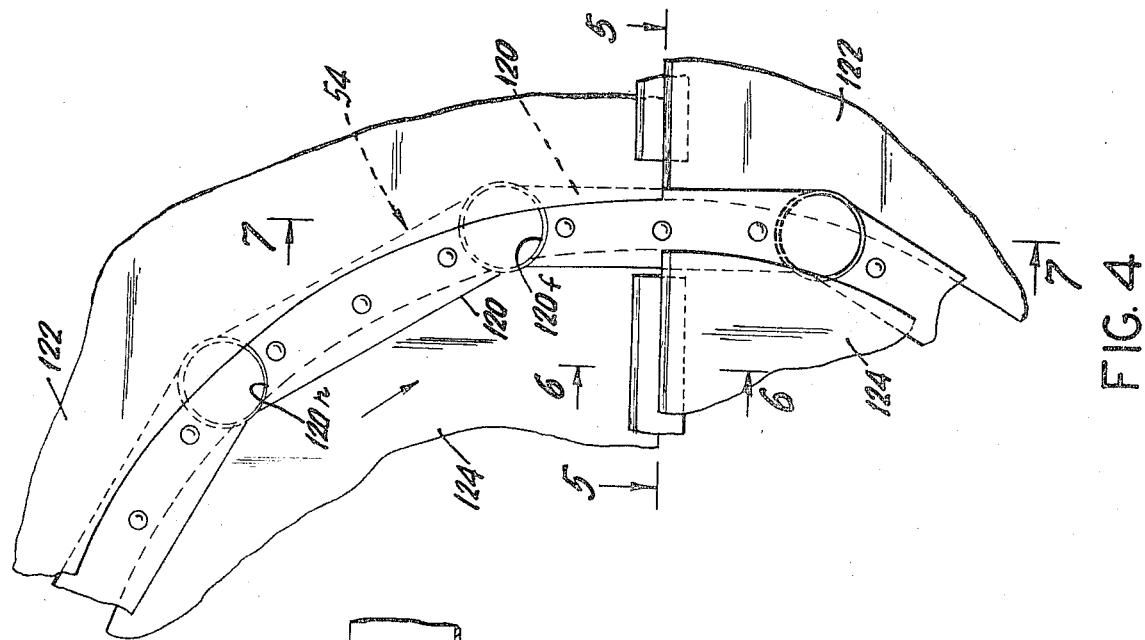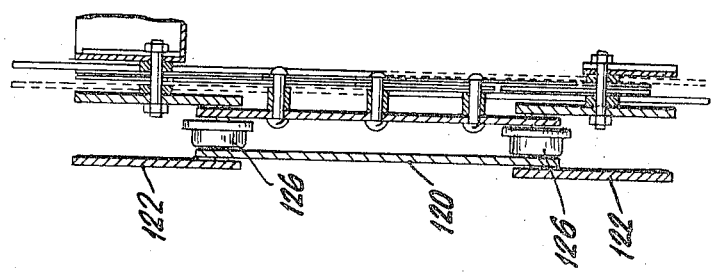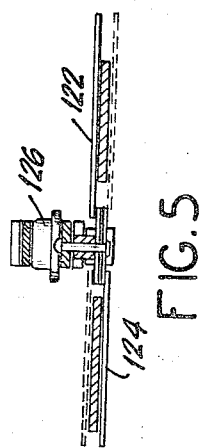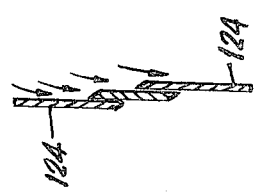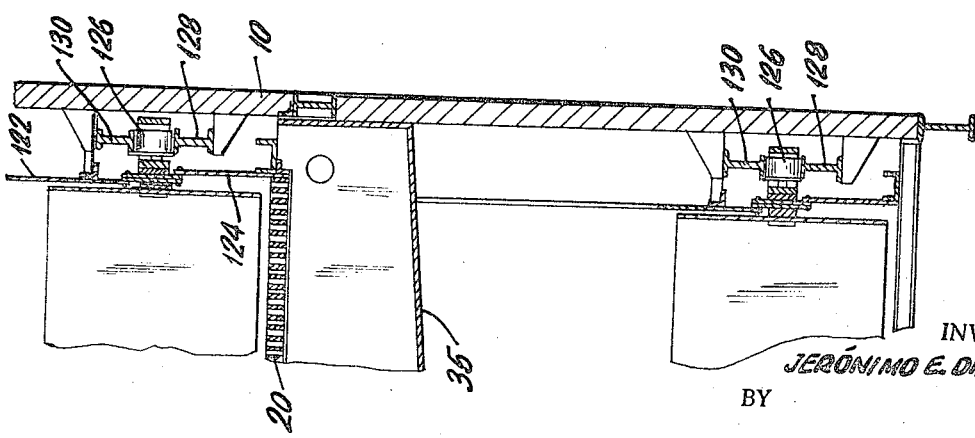

3,553,013
APPARATUS FOR DIFFUSION AND LIXIVIATION OF SUGAR CANE, BEET-SUGAR OR SWEET SORGHUM
Jerónimo E. Díaz-Compain, P.O. Box 370, Cathedral Station, New York, N.Y. 10025
Filed May 15, 1968, Ser. No. 729,190
Int. Cl. B01d *11/03;* C13d *1/10, 1/12*
U.S. Cl. 127—5
7 Claims

ABSTRACT OF THE DISCLOSURE

An apparatus for treating a product such as sugar beet, sugar cane, sweet sorghum and the like, comprises a closed housing the interior of which is subdivided into two or more decks having both screen and heating areas and including an endless conveyor arranged between two adjacent decks for moving pushers to transport the material to be treated over the screen and heating areas. A constituent of the product, such as a sugar from sugar beet chips, is extracted by directing liquid over the material as it is advanced and collecting the juices below the screens in tanks and thereafter recirculating it in a counterflow manner.

SUMMARY OF THE INVENTION

This invention relates in general to the construction of apparatus for treating a product and in particular to a new and useful apparatus, particularly for extracting sugar from sugar cane and sugar beet and which includes a housing having vertically spaced decks over which the material is advanced by an endless conveyor, first in a forward direction over the upper deck and then downwardly to the lower deck in a reverse direction during which the material is treated with a liquid for the extraction of a constituent therefrom such as sugar.

The present invention is an improvement over the construction disclosed and claimed in applicant's Patent No. 3,244,560 dated Apr. 5, 1966, particularly in respect to the arrangement for the transportation of the material to be treated and for the collecting of the juices in individual tanks and the recirculation of the liquid in the manner such that the material is contacted by liquid of decreasing concentration as it progresses along its path.

In addition to the apparatus disclosed and claimed in applicant's patent in which the material to be treated is submerged in a single tank arranged at one deck level and then moved around by a conveyor for submersion in an opposite direction in a tank on a second level, it has been known to provide an apparatus for treating material with a liquid as it moves continuously along a single horizontal conveyor. The present invention is an improvement over such devices, particularly in respect to the compact arrangement of the two decks such that the material may be moved over one deck in one direction and the other vertically adjacent deck in an opposite direction by a single conveyor mechanism. In addition, the decks are constructed such that heating elements are provided on the deck floors for controlling the temperature of the liquid which is employed for the extraction process.

A further advantage of the vertically arranged decks with a single conveyor servicing two adjacent decks is that the connecting tanks and the associated piping for recirculating materials may be much shorter than a stretched out conveyor arrangement. In addition, the treatment liquid may be more easily controlled and recirculated and it is easier to conserve the heating energy within the single compact housing.

A further improvement provided by the present invention is the arrangement of a conveyor within a housing such that the liquid may be circulated through the material conveyed at two deck levels and the interior of the housing may be substantially sealed against escape of the liquid and/or vapors therefrom. In order to accomplish this sealing, the conveyor advantageously includes chain or link elements which are constructed to provide a seal plate when they are moved in an opening defined between upper and lower plate elements of the housing. The plate is moved such that any liquid which is directed against the plate will be deflected back downwardly into the housing and away from the conveyor mechanism. In order to insure that this deflecting action is complete, the chain links are moved from a location at which a lower portion bears on the exterior of a plate at the upper reach of the conveyor and transferred to the lower reach of the conveyor at which the lower portion of each link is shifted to bear on the interior of the plate at the lower portion of the housing in the vicinity of the lower deck.

Accordingly it is an object of the invention to provide a device for treating sugar cane, sugar beet, sorghum and the like, which includes a housing having two decks for treating material which is moved over the decks by an endless conveyor extending from one deck to the other and wherein the material is treated by a liquid which is circulated within the housing and it is heated by plates over which the material to be treated is moved and wherein the circulation is accomplished by collecting the liquid below the decks in tanks and circulating it for delivery to the material again in a manner such that the concentration of the liquid decreases in the direction of movement of the material.

A further object of the invention is to provide an apparatus for the diffusion of products which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:
FIG. 1 is a top plan view of a device for the diffusion and lixiviation of sugar cane, sugar beet or sweet sorghum constructed in accordance with the invention;
FIG. 2 is a section taken on the line 2—2 of FIG. 1;
FIG. 3 is a section taken on the line 3—3 of FIG. 2;
FIG. 4 is a partial side elevational view taken outboard of, and in the same direction as section line 2—2 and adjacent one end of the conveyor indicating the sealing construction of the conveyor chain links with the housing-wall side-deflectors;
FIG. 5 is a section taken on the line 5—5 of FIG. 4;
FIG. 6 is a partial sectional view taken along the line 6—6 of FIG. 4; and
FIG. 7 is a sectional view taken along the line 7—7 of FIG. 4.

DETAILED DESCRIPTION OF THE PREFERRED EMBODIMENT

Referring to the drawings in particular, the invention embodied therein comprises an apparatus for diffusing a sugar product which comprises wall means defining a horizontally elongated housing 10 which includes an interior upper deck or treatment path 10 and an interior lower deck or treatment path generally designated 12. Adjacent the upper portion of one end, the housing is provided with an inlet conduit 14 for the infeed of material to be treated such as sugar cane chips which are directed to the hopper by a distributing device or conveyor generally designated 16. At the same end but adjacent the bottom portion of the housing there is defined a discharge chute 18.

In accordance with a feature of the invention, each deck 10 and 12 includes a plurality of separate areas having bar screens 20 and a plurality of additional areas having heating plates 24 over which the material is passed when it is fed during the treatment process. The areas with the bar screens 20 are located over each one of a plurality of top tanks 31 to 39 and each one of a plurality of bottom tanks 41 to 49.

In accordance with another feature of the invention, each end of the housing 10 is rounded to accommodate respective sprockets 50 and 52 around which is trained an endless chain conveyor generally designated 54. Tension on the chain is maintained by a weight 56 which is suspended on a cable 58 and urges the shaft mounting for the sprocket 52 in a longitudinal direction away from the sprocket 50. Suitable mounting means (not shown) are provided for mounting the shaft for this longitudinal biasing movement. The conveyor chain 54 carries a plurality of spaced slats or pushers 60, only some of which are indicated, which move behind the material which is delivered through the inlet 14 and advance it in the direction of the arrows 62 at a controlled rate for the treatment process. The product to be treated, for example sugar cane chips, is dumped into the inlet 14 to the level 64. The movement of the conveyor 54 causes the pushers 60 to advance the material in the direction of the arrows 62. As the sugar cane chips are advanced, they are continuously treated with a treatment liquid such as hot water to extract the sucrose from the cane chips.

The treatment liquid is delivered to a plurality of transverse liquid troughs or channels located at the top and numbered 65 to 74 or lower troughs or channels numbered 75 to 82 located intermediate the height of the housing 10. The top channels 65 to 74 are each provided with a cover which may be pivoted openly at the top wall 84 of the houing 10 for inspection purposes. In the preferred arrangement of the invention, a treatment liquid is circulated from a collection tank to one of the channels in a direction opposite to the movement of the material by the conveyor and at a rate and quantity in accordance with operating experience to obtain the most satisfactory extraction of the sucrose from the sugar cane. For example, liquid is circulated from the collecting tank 41 located at the end of the treatment path to the distributing channel 76 and from the tank 42 it would be delivered to the distributing channel 77 and so on backwardly to the inlet 14. The rate of circulation is controlled by suitable control means (not shown) for regulating the speed of a pump to cause the channels 65 to overflow and produce a uniform downward spray over the material. This spray which strikes the upper level 64 of the material as it is advanced is distributed through the chips as liquid or moisture generally along the dotted lines indicated 86.

The treatment liquid circulation for some of the tanks are indicated by way of example to the right of the drawing indicated in FIG. 2 but they are not shown in the remaining portion of the figure for clarity of illustration purposes. Pump 90, for example, which takes suction from the collecting tank 48, delivers the treatment liquid to the channel 74. Pump 92 which takes suction from the tank 49 is indicated as discharging to the distribution channel 73. Pump 94 takes suction from the tank 38 and directs it into the distribution channel 71. Pump 96 takes suction from the tank 39 and directs it into the distribution channel 72.

The material which is delivered by the conveyor pusher 60 from the inlet to the opposite end of the housing contacts a kicker or breaker paddle 98 which breaks up the blanket of material and causes it to move easily downwardly to the lower deck 12 for further movement along a lower treatment path. At the end of the lower treatment path, the material is engaged by a pressure roller or squeeze roller 100 which causes the break up of the material further for transmission between a second kicker 102 and into the discharge opening 18. At this stage, the chips have been disintegrated and diffused to the point where the resultant bagasse or pulp may be conveyed away from the apparatus by a conveyor (not shown).

As best indicated in FIG. 2, the housing 10 is constructed within the platform structure 104 which includes stair portions 106 and 107. The sprocket 50 (FIG. 1) is carried on a shaft 108 which is rotated by a variable speed motor 110 driving through a speed reducer 112 and appropriate gearing 114. A suitable auxiliary drive 116 is provided for the pressure roller 100 and for oscillating an arm 118 on which it is mounted.

In accordance with a further feature of the invention, as indicated in FIGS. 3 to 7, the conveyor generally designated 54 comprises an endless chain made up of individual link members 120 which are rounded at one end 120f and which include a concave circular recess 120r at the opposite end. Corresponding rounded ends 120f fit into corresponding recesses 120r of each adjacent link and the interconnected links define sealing plates 120 between splash plates 122 and 124 which shield the treatment chamber from the conveyor sprocket elements 126 which are trained between beams 128 and 130. Corresponding splash plates 122 and 124 are located adjacent both the top deck 11 and the bottom deck 12. A feature of the construction is that the plate-like links 120 are guided between the splash plates 122 and 124 at the end of the first treatment path or the end of the upper deck in a manner such that the links move from a position at which the lower portion is exposed above the plate 124 and below the plate 122 to the location along the section line 5—5 of FIG. 4 wherein the plate-like links 120 reverse their position in respect to the associated plates and move the lower portion under the associated plate 124 and the upper portion over the associated plate 122 in order to complete the turn-around.

The conveyor construction 54 is such that the chains can operate satisfactorily without becoming fouled with the treatment material and hence the apparatus can be assured of a long life and without any contamination of the products being treated.

While a specific embodiment of the invention has been shown and described in detail to illustrate the application of the inventive principles, it will be understood that the invention may be embodied otherwise without departing from such principles.

What is claimed is:

1. An apparatus for the diffusion and lixiviation of a product such as sugar cane, sugar beet, sweet sorghum and the like, comprising a housing having interior wall means defining at least two vertically spaced horizontal decks, each of said decks having at least one screen area and tank means below said screen area and respectively defining an upper treatment path and a lower treatment path, with the lower treatment path being long enough to receive material directed off one end of the upper treatment path, heating means located in each of said treatment paths, and a continuous endless conveyor having pusher means at spaced locations therealong with an upper reach moving through said upper treatment path and a lower reach moving through said lower treatment path to advance material first in one direction along said upper treatment path and downwardly to the lower treatment path and then in an opposite direction along said lower treatment path, and treatment liquid distributor means for directing a treatment liquid at a plurality of locations along each of said treatment paths over the material being advanced along said treatment paths by said conveyor pusher means and for collecting this liquid in said tank means below said decks, and pump means connected to said tank means for recirculating the collected liquid back to individual ones of said treatment liquid distributor means.

2. An apparatus according to claim 1, wherein each of said treatment paths has a plurality of screen areas along its length, said tank means comprising a collecting tank located beneath each screened area for collecting liquid dropping through said screened area, said treatment liquid distributor means comprising a plurality of liquid distribution channels at spaced locations along the length of each of said paths, an inlet for material adjacent one end of the upper reach of said conveyor for delivering material into said upper treatment path, and a discharge connected to said lower treatment path at the opposite end thereof from the end receiving material from said upper treatment path, and wherein said pump means circulates liquid from some of said tanks to respective ones of said liquid distribution channels in a manner such that at least some of the material being moved through said first and second treatment paths is contacted by a liquid of progressively lower concentration as it moves from said inlet towards said discharge.

3. An apparatus according to claim 2, wherein said distribution channels have overflow edges, and said pump means circulates treatment liquid from said collecting tanks to said channels in an amount to overflow onto the material passing through said first and second treatment paths.

4. An apparatus according to claim 2, wherein said conveyor comprises a chain conveyor having a plurality of links formed as sealing plates, and splash plates defined on each side of said housing and engaged with respective upper and lower portions of said sealing plates on opposite sides thereof and forming a seal therewith.

5. An apparatus according to claim 4, wherein said link elements and said splash plates are constructed to permit said links to move from the position at which the lower portion of each link is exposed on one of said splash plates and the upper portion is exposed on the opposite side of the other of said splash plates to a position in which the reverse is true when the chain moves from the upper reach to the lower reach.

6. An apparatus according to claim 2, wherein said conveyor comprises a conveyor chain, first and second sprocket wheels arranged at respective ends of said housing between said upper and lower reaches of said conveyor, and means for biasing said first and second sprocket wheels away from each other to maintain tension on said sprocket chain.

7. An apparatus according to claim 6, including a top wall of said housing having a plurality of inspection openings communicating with said distributor channels.

References Cited

UNITED STATES PATENTS

| | | | |
|---|---|---|---|
| 2,684,288 | 7/1954 | De Smet | 23—270B |
| 3,275,472 | 9/1966 | Tantawi et al. | 127—45X |
| 3,420,708 | 1/1969 | Schaffer | 127—3X |

FOREIGN PATENTS

| | | | |
|---|---|---|---|
| 118,022 | 1959 | U.S.S.R. | 23—270 |
| 1,096,906 | 6/1955 | France | 23—267 |

JOSEPH SCOVRONEK, Primary Examiner

D. G. CONLIN, Assistant Examiner

U.S. Cl. X.R.

23—270; 127—3, 43, 45